United States Patent [19]

Heeter et al.

[11] Patent Number: 5,022,554
[45] Date of Patent: Jun. 11, 1991

[54] PAPER TABLEWARE WITH METALLIZED LAYER

[75] Inventors: William B. Heeter, Appleton; Katherine F. Hickey, Oshkosh, both of Wis.

[73] Assignee: Chesapeake Consumer Products Company, Appleton, Wis.

[21] Appl. No.: 474,916

[22] Filed: Feb. 5, 1990

[51] Int. Cl.⁵ ............................................... B65D 5/56
[52] U.S. Cl. .................................... 220/456; 229/3.1; 229/3.5 MF; 428/328; 428/35.8; 428/416
[58] Field of Search ............... 220/453, 456, 455, 458, 220/419, 442, 450, 460, 462; 229/3.1, 3.5 MF; 428/328, 35.8, 410

[56] References Cited

U.S. PATENT DOCUMENTS

| | | | |
|---|---|---|---|
| 3,821,015 | 6/1974 | Feinberg | 229/3.1 |
| 4,211,339 | 7/1980 | Itoh | 229/3.1 |
| 4,308,985 | 1/1982 | Manizza et al. | 220/458 |
| 4,349,124 | 9/1982 | Faller | 229/3.1 |
| 4,452,859 | 6/1984 | Nishijima et al. | 220/458 |
| 4,543,280 | 9/1985 | Fujita et al. | 220/458 |
| 4,556,166 | 12/1985 | Penttilia | 220/458 |
| 4,753,832 | 6/1988 | Brown et al. | 229/3.1 |

Primary Examiner—Joseph Man-Fu Moy
Attorney, Agent, or Firm—Quarles & Brady

[57] ABSTRACT

Paper tableware, such as plates, cups, etc., made of a paper substrate, a metallized plastic film joined to the substrate, and an FDA-approved topcoating over the plastic film. A color coating can be applied between the plastic film and the topcoating.

7 Claims, 2 Drawing Sheets

PAPER TABLEWARE WITH METALLIZED LAYER

FIELD OF THE INVENTION

The present invention relates generally to the art of paper tableware such as paper plates, paper cups and the like.

BACKGROUND

Paper plates and cups are in widespread use in homes and commercial and institutional food service operations for various reasons, including the elimination of the time and expense attendant upon washing dinnerware but also for the ability to use tableware with special designs for unique or one time functions such as parties and holidays. Paper tableware of the subject type can be made of natural or uncolored bleached paperboard stock, which results in very plain looking products that are white or off-white in color. In order to provide a more decorative and appealing product, paper tableware is often made with printed designs, logos, legends, and the like, to provide a product with greater visual impact; for example, paper tableware can be printed with a seasonal motif such as a Christmas design, a design relating to a birthday party, or a corporate name or logo. A barrier coating of a type approved by the Food and Drug Administration, FDA, is applied as a protective measure over the surfaces of the tableware that would come in contact with food or drink, including any printing on the various products.

Printing as a means for enhancing the appearance of paper tableware, while attractive and in widespread use, has limitations with respect to the visual impact and appearance of the printed design or information. The printing inks available for this purpose are generally dull or rather lifeless in appearance, so that the special effects that can be obtained with the prior art techniques are restricted. There is, therefore, a growing need or market demand for paper tableware that has a more festive or dramatic appearance than the products now available. Accordingly, among the principal objects of our present invention are: to provide new constructions for paper tableware; to develop new paper tableware constructions that provide visual impact not currently available with the prior art constructions; and to provide paper tableware constructions that will further extend the potential uses for paper products. These and other more specific objects of our invention will become apparent in the detailed description which follows.

SUMMARY OF THE INVENTION

In its presently-preferred embodiment, the paper tableware of our present invention includes a light-transmitting plastic film that has a vacuum deposited metal coating on one of its surfaces and an uncoated opposite surface; the plastic film is incorporated in paper tableware by laminating its metallized surface to a suitable tableware paper substrate. Further, an FDA approved light-transmitting barrier coating is applied over the uncoated surface of the plastic film. Optionally, a light-transmitting color coating can be applied on the uncoated surface of the plastic film between it and the barrier coating. The resulting products, which can be in various colors, have a brilliant, shiny metallic appearance that is unique and unattainable by prior art techniques. The metallized coating along the interior surface of the plastic film acts to reflect light through the light-transmitting laminae above it to thereby provide the metallic appearance of the tableware. Particularly attractive design effects also can be obtained by means of an opaque color coating that masks selected portions of the metallized plastic film, as described below.

DESCRIPTION OF THE DRAWINGS

The following detailed description of the present invention, including several presently-preferred embodiments, is made by reference to the accompanying drawings, in which.

DESCRIPTION OF PRESENTLY-PREFERRED EMBODIMENTS

Figure 1:
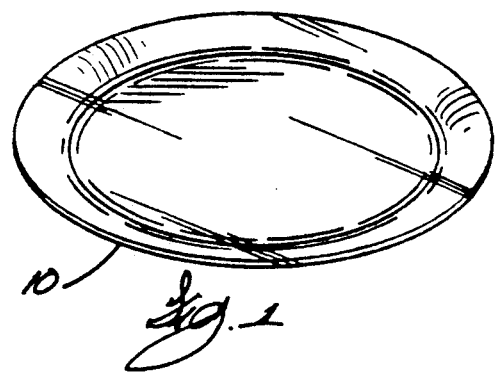
FIG. 1 is a perspective view of a paper plate made in accordance with our invention.
Figure 3:
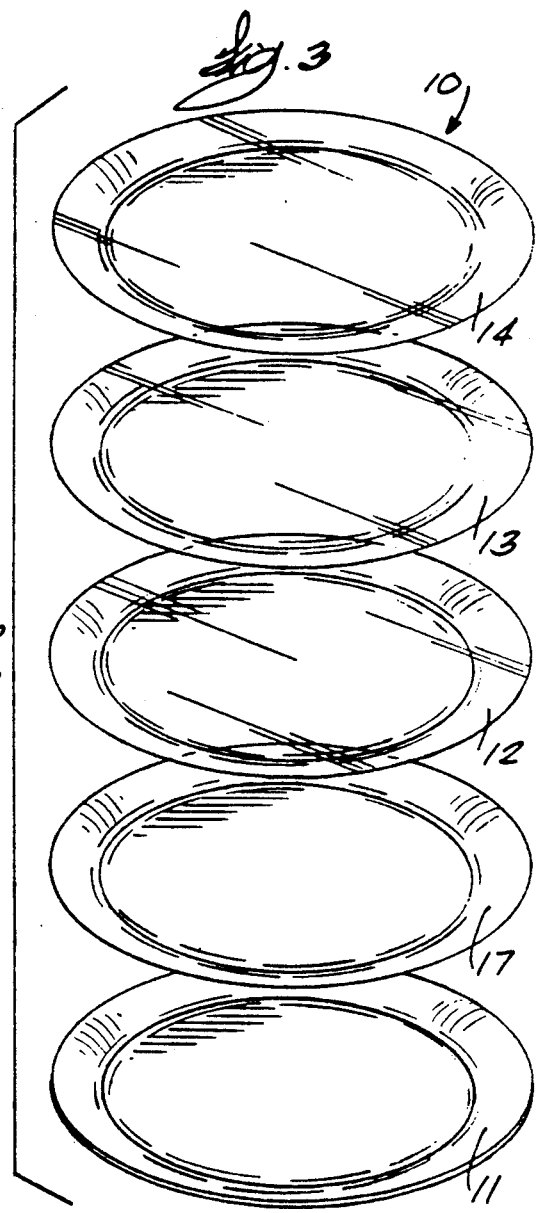
FIG. 3 is an exploded view illustrating the several layers of the paper plate of FIG. 1.
Figure 2:
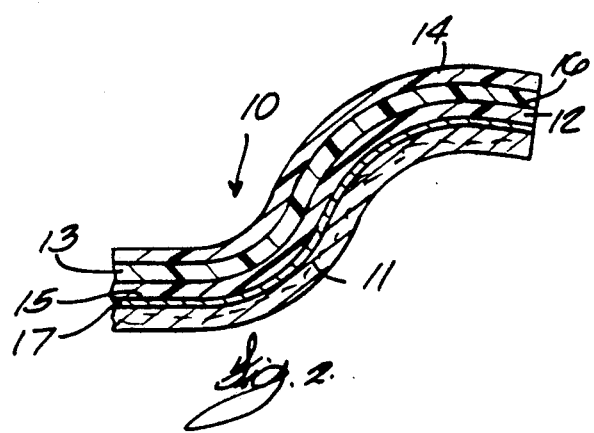
FIG. 2 is a partial sectional view of the paper plate of FIG. 1.

(a) FIGS. 1-3

A paper plate 10 constructed in accordance with the present invention is illustrated in perspective in FIG. 1 and in section in FIG. 2. Although plate 10 is shown as a dinner plate in the drawings, the term "plate" as used in this description and in the claims is defined to mean a plate of any selected size, bowl, platter and serving dish. Plate 10 includes a paper substrate 11, plastic film 12, color coating 13 and topcoating 14.

The paper substrate 11 is to comprise any of the paperboard stocks typically employed for the manufacture of paper plates. For example, 16 to 24 point SBS, i.e. solid bleached sulphite, paperboard can be used for the paper plates of the invention.

Plastic film 12 is a light-transmitting plastic film and includes an inner surface 15 that faces paper substrate 11 and an outer surface 16 opposite therefrom. The term "light-transmitting" as used herein in the description and claims with respect to film 12 and coatings described below is defined to mean that the film or coating is transparent or translucent.

Film 12 is preferably a transparent flexible plastic film; many types of commercially available films are suitable including polyester films such as polyethylene terephthalate, polyolefin films such as polyethylene and polypropylene, vinyl films, etc. The thickness of film 12 can vary widely, such as in the range of about 0.5 to 10 mils (0.0005–0.010 inches) thick, but thicker films can be employed if so desired. In general, we have found a film 12 of about 0.5 mils thick is appropriate for most paper tableware.

A vacuum deposited metal coating 17 is applied along inner surface 15 of plastic film 12. Metal coating 17 can be applied by any of the vacuum deposition procedures well known in the art. A widely practiced technique is that known as sputtering vacuum deposition, often referred to simply as sputtering, in which a negative DC or RF voltage supply is applied to a sputtering metal target that is contained within a vacuum chamber. A partial vacuum is drawn in the vacuum chamber, generally in the range of a few millitoor to about 100 mTorr, in the presence of an inert gas such as argon or a reactive gas mixture such as argon and oxygen. A gas plasma or glow discharge is created between the metal target and the plastic film to be coated. Positively charged gas ions generated in the plasma region are attracted to the negative potential at the target and propelled towards it at a very high velocity, resulting in the ejection of neutral atomic size particles of the metal target. These particles traverse the space between the metal target and the substrate film and are deposited or condensed as a thin coating on the film. The target material can be a metal or a metal alloy. Additional information concerning sputter coating is widely available, such as in *Thin Film Processes,* Vossen & Kern, published by Academic Press, Inc., 1978. The vacuum deposition process produces a thin metal coating on film 12, on the order of about 200 to 5,000 Angstroms thick.

After metal coating 17 has been deposited along inner surface 15 of plastic film 12, the film is laminated to substrate 11, using any appropriate adhesive of which many types are well known in the art. It is most useful to arrange film 12 with coating 17 in contact with substrate 11 as this arrangement places the metallic coating 17 along an interior portion of plate 11.

The metal coating 17 on the plastic film can consist of any nontoxic metal or metal alloy. For reasons of cost and acceptability, an aluminum metallized coating 17 is most useful in the practice of the present invention. This will result in a plate 10 that will have a bright silvery or shiny aluminum color. Of further importance, however, is that the use of an aluminum metal coating on film 12 provides a great deal of flexibility in that paper tableware in many different colors can be easily produced. When it is desired to provide tableware in a color other than the silvery aluminum appearance, color coating 13 is applied over outer surface 16 of plastic film 12. Color coating 13 is a light-transmitting coating, specifically a clear or transparent coating, in this first embodiment. By this means, we have produced paper tableware having brilliant, shiny metallic colors in red, blue, gold, green, orange, black and purple, in addition to silver in constructions that do not include a color coating. The ability to be embodied in paper tableware having a brilliant metallic appearance in various colors is an important advantage and objective of the construction of this first embodiment of our present invention. Various compositions can be used for coating 13. For example, color coating 13 can be applied as a solvent solution comprising a light-transmitting polymeric binder and one or more solvent soluble organic dyes dispersed in the binder. The coating can be formulated with two or more polymeric components. Color coatings in red, gold and green have been produced with organic dyes dispersed in a light-transmitting polymeric binder comprising a vinyl polymer, melamine polymer and styrene allyl alcohol. The color coating also may comprise a light-transmitting polymeric binder and a finely divided color pigment dispersed in the binder; color coatings in purple, green, black and blue have been successfully employed in paper tableware of the invention with a color coating of this type. A coating weight in the range of about 1.0 to 2.0 pounds per ream of film (3,000 square feet) is suitable for the color coating in most instances. Another composition suitable for the color coating is a light-transmitting printing ink that is applied by printing equipment to surface 16 of the plastic film. Color coatings in various colors can be applied with the printing ink technique. Many types of polymeric compounds, organic dyes, pigments and printing inks suitable for use in the color coating are commercially available from numerous sources.

Topcoating 14 is applied over color coating 13 of plate 10. Topcoating 14 is to consist of a light-transmitting barrier coating and is applied at a thickness or coating weight sufficient to provide the requisite barrier characteristics. A coating weight in the range of about 1.0 to 2.0 pounds of coating per ream of film is suitable for a topcoating in most instances. Topcoating 14 can be applied as a solvent solution, comprising a light-transmitting polymeric material in an appropriate solvent, or a combination of two or more such polymeric materials. A clear coating comprising a vinyl polymer, melamine polymer and styrene allyl alcohol has been successfully employed. Many types of polymers and compounds suitable for topcoating 14 are available commercially from numerous sources.

The materials and compounds selected for film 12, color coating 13 and top coating 14 should meet the requirements of the Food and Drug Administration pertaining to materials that come in contact with food. Thus, the term "FDA-approved" when used herein and in the claims in connection with film 12, color coating 13 and topcoating 14 is defined as meaning the respective layer meets the requirements of Title 21 CFR, more particularly 21 CFR §§174 to 177. Thus, topcoating 14 should be an FDA-approved coating, by which is meant that all of the components of its formulation meet the requirements of 21 CFR §174–177. Similarly, it is preferable that color coating 13 is an FDA-approved coating and that the film selected for film 12 is an FDA-approved film.

FIG. 3 is an exploded view of plate 10 to further clarify its structure. The sequence of layers, starting with the lowermost layer, consists of paper substrate 11, metal coating 17, plastic film 12, color coating 13 and topcoating 14. An adhesive layer joining film 12 to substrate 11 is not shown in the drawings.

Figure 4:
FIG. 4 is a perspective view of a paper cup made in accordance with our invention.
Figure 5:
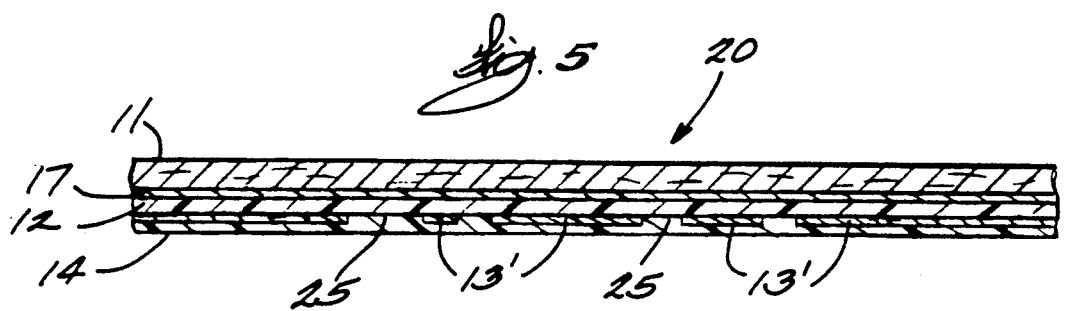
FIG. 5 is a partial sectional view of the paper cup of FIG. 3.

(b) FIGS. 4 and 5

FIGS. 4 and 5 illustrate, in perspective and sectional views respectively, a paper cup 20 constructed in accordance with the present invention. Cup 20 includes a paper substrate 11, plastic film 12 and topcoating 14, wherein plastic film 12 has a metal coating 17 on its interior surface 15 joined to the substrate. These elements of paper cup 20 are the same as described in section (a) above, although it may be noted that a lighter weight substrate such as 10 to 14 point SBS is often used for cups. The cup also can include an FDA-approved barrier coating over its interior surface, not shown, such as wax or polyethylene, as is well-known in the art. Further, however, cup 20 includes a color coating 13' on surface 16 of film 12 that is opaque. Coating 13' may comprise a layer of printing ink printed over surface 16 in a selected color. Referring now to FIG. 4, color coating 13' is printed onto the film 12 in such fashion as to provide a legend 21 in reverse printing, i.e. portions of film 12 are coated by opaque color coating 13' and other portions of the film are not coated by coating 13'. Opaque color coating 13, thereby masks portions of film 12, and unmasked portions 25 (see FIG. 5) of the film define the legend 21. The illustrated construction provides a background that is in the color selected for opaque coating 13' and a legend 21 that is in the color of metal layer 17; a particularly attractive and sophisticated product is formed by printing coating 13' in black opaque ink on a film 12 having a vacuum deposited aluminum coating 17, to thereby provide a bright silvery metallic legend 21 surrounded by the black background of opaque color coating 13'.

Opaque color coating 13' can be applied to form legends other than the specific legend illustrated in FIG. 4, and also can be applied so as to develop a patterned design instead of or in addition to a legend. Further, paper plate 10 described previously also can include an opaque color coating 13' applied in a selected pattern to show uncovered portions of metal layer 17 in either a legend or design.

Figure 6:
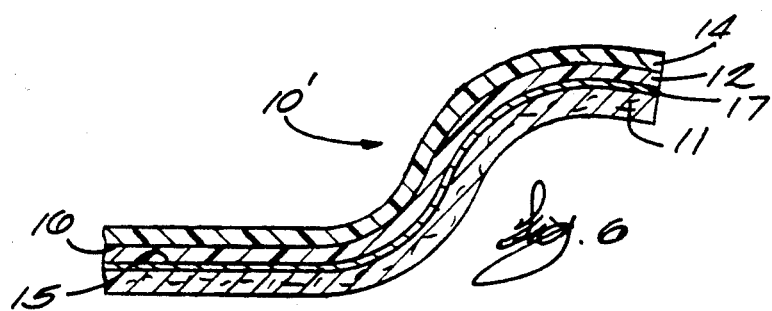
FIG. 6 is a partial sectional view of a third paper tableware construction in accordance with our invention.

(c) FIG. 6

The combination of a color coating with the other elements of the above constructions, either a light-transmitting coating 13 or opaque color coating 13', provides the paper tableware manufacturer with a great deal of flexibility in providing many different types of new products. As noted previously, however, the color coating is an optional element in paper tableware of the invention. FIG. 6 illustrates a paper plate 10' of the construction consisting of paper substrate 11, plastic film 12 with its metallized coating 17 laminated to the substrate, and light-transmitting barrier topcoating 14 applied over outer surface 16 of film 12. The plate 10' will thereby have the appearance and natural color of the metallized coating 17. For example, paper tableware with a shiny metallic silver appearance is produced when metallized layer 17 is vacuum deposited aluminum. Also, however, other metals or metal alloys can be used for coating 17 to develop different metal colors.

(d) Method of Manufacture

A useful method for the manufacture of paper tableware according to the present invention is as follows. The first step includes providing a web of plastic film 12 that has a vacuum deposited metal coating 17 on one of its surfaces. The web of plastic film 12 is joined to a paper substrate 11 selected for the particular tableware to be manufactured, which step may involve adhesive lamination with or without heat or pressure as appropriate to whatever technique is selected for this purpose. A color coating, when used, is applied over the outer surface of the plastic film. The barrier topcoating is applied over the outer surface of the plastic film when a color coating is not used, or applied over the color coating when included in the construction. The composite web assembly is then led to a moistening apparatus wherein water is lightly misted onto the paper substrate, and, when paper plates are to be made, the web is led to a plate former that cuts out a disk for each plate and feeds the disk between male and female dies to form the paper plates. When paper cups are to be made, a sheet is cut from the web and formed into a cylinder, following which a bottom disk is crimped and glued or heat sealed onto the cylinder and a lip is formed about the open to of the cup.

As illustrated in the drawings, the metallized plastic film 12 is applied to the top surface of the plate 10 and the exterior surface of the cup 20. It has been found that the metallized plastic film need be applied to only one surface of the tableware in order to achieve the desired effect; of course, however, metallized plastic film can be applied to both surfaces of tableware if so desired. Paper tableware constructed in accordance with our invention has a new and exciting appearance developed by the shiny metallic effect produced by the combination of structural elements as described above. The color coating element in tableware of our invention provides the manufacturer and end user with a broad palette of colors for the new tableware. The prior art has not previously taught paper tableware of the constructions of the present invention. The foregoing detailed description of several embodiments of paper tableware according to the concepts of our invention presents a complete and enabling description to those skilled in the art; the embodiments are illustrative and it is expected that changes and modifications to the embodiments described can be made by those of ordinary skill in the art that will remain within the true spirit and scope of this invention.

We claim:

1. Paper tableware such as paper plates and paper cups, comprising in combination:
   (1) a paper substrate;
   (2) a light-transmitting plastic film joined to the substrate including a first surface and a second surface, and a vacuum deposited metal coating on the first surface of the plastic film; and
   (3) a light-transmitting barrier topcoating over the second surface of the plastic film.

2. Paper tableware such as paper plates and paper cups, comprising in combination:
   (1) a paper substrate;
   (2) a light-transmitting plastic film including a first surface and a second surface,
      (a) a vacuum deposited metal coating on the first surface of the plastic film,
      (b) the plastic film being joined to the substrate with the metal coating contacting the substrate;
   (3) a color coating on the second surface of the plastic film; and
   (4) a light-transmitting barrier topcoating over the color coating.

3. Paper tableware according to claim 2, wherein the color coating comprises a dye dispersed in a light-transmitting binder.

4. Paper tableware according to claim 2, wherein the color coating is a printed ink coating.

5. Paper tableware according to claim 2, wherein the color coating comprises a pigment disposed in a light-transmitting binder.

6. Paper tableware according to claim 2, wherein the color coating is an opaque coating in a pattern masking portions of the plastic film, and unmasked portions of the plastic film define a design or legend.

7. Paper tableware according to any of claims 2, 3, 4, 5 or 6 wherein:
   the metal coating on the plastic film is aluminum.

* * * * *